United States Patent
Leitch (12)

(10) Patent No.: US 6,360,634 B1
(45) Date of Patent: Mar. 26, 2002

(54) PULL STUD REMOVAL DEVICE

(75) Inventor: David W. Leitch, Kent, WA (US)

(73) Assignee: Orca Engineering, Inc., Auburn, WA (US)

( * ) Notice: Subject to any disclaimer, the term of this patent is extended or adjusted under 35 U.S.C. 154(b) by 0 days.

(21) Appl. No.: 09/290,479

(22) Filed: Apr. 12, 1999

(51) Int. Cl.$^7$ ............................................... B25B 13/00
(52) U.S. Cl. ....................................... 81/124.2; 81/125
(58) Field of Search .................................. 81/119, 121.1, 81/124.2, 125

(56) References Cited

U.S. PATENT DOCUMENTS

| | | | | |
|---|---|---|---|---|
| RE4,019 E | * | 6/1870 | Kroh .......................... | 81/121.1 |
| 169,489 A | | 11/1875 | Smeaton | |
| 975,292 A | | 11/1910 | Schramm | |
| 1,181,565 A | | 5/1916 | Block | |
| 2,219,907 A | * | 10/1940 | Ross ........................... | 81/125 |
| 2,503,364 A | * | 4/1950 | Viets .......................... | 81/124.2 |
| D160,267 S | * | 9/1950 | McCammon et al. ...... | 81/124.6 |
| 3,010,346 A | | 11/1961 | Kulp | |
| 4,096,621 A | | 6/1978 | Berger et al. | |
| 4,161,896 A | * | 7/1979 | Creed ......................... | 81/124.2 |
| 5,148,727 A | * | 9/1992 | Williamson ................. | 81/121.1 |
| H1689 H | * | 11/1997 | Foucher ...................... | 81/124.2 |
| 5,697,268 A | | 12/1997 | Makovsky et al. | |
| 5,809,851 A | | 9/1998 | Thompson | |
| 5,926,931 A | | 7/1999 | Collins | |

FOREIGN PATENT DOCUMENTS

GB              604812      *    7/1948  ................. 81/124.2

OTHER PUBLICATIONS

Engineering schematic for a ½"–Drive Blank Socket for Cat. #50 Rev. Knob, Caterpillar Tooling Division, Aug. 1990, 3 pp.

Torque–Rite Retention Knob Socket Wrench, Western Tool & Supply Co. catalog, prior to Nov. 1999, 1 pp.

* cited by examiner

Primary Examiner—Joseph J. Hail, III
Assistant Examiner—Joni B. Danganan
(74) Attorney, Agent, or Firm—Christensen O'Connor Johnson Kindness PLLC

(57) ABSTRACT

The pull stud removal device (10) selectively attaches to a specific model of pull stud (12), which is in turn threadably mounted in a tool holder (14). The removal device (10) has a polygonal-shaped body (20) that includes a top end (22), a bottom end (24), and six outer sidewalls (26) that are configured to form a tool receiving pattern. The top end (22) of the body (20) of the removal device (10) contains a drive socket cavity (28) that is sized and adapted to correspondingly mate with a drive socket (18). The body (20) contains an aperture (30) that penetrates the bottom end (24) and at least one outer sidewall (26). The body (20) of the removal device (10) is sized and configured to laterally slidably receive only a specific model design of pull stud (12). The aperture (30) is circumscribed by a plurality of inner wall surfaces (32) that are correspondingly sized and configured to closely mate with only the particular model of pull stud (12). The receival of a pull stud (12) into the aperture (30) of the removal device (10) results in a portion of the majority of the inner wall surfaces (32) of the aperture (30) mating with a substantially large region of the outer surface area of a pull stud (12), thereby significantly increasing the level of torque that may be applied to a pull stud through a drive socket (18) mounted in the drive socket cavity (28) of the removal socket (10), for tightening and removing a pull stud (12) from a tool holder (14).

20 Claims, 5 Drawing Sheets

PULL STUD REMOVAL DEVICE

FIELD OF THE INVENTION

The present invention relates to a device for removing pull studs, and more specifically to a socket-type pull stud removal device that substantially increases the level of torque that can be applied to a pull stud, which in turn dramatically increases the ease of pull stud removal and installation.

BACKGROUND OF THE INVENTION

A large amount of machining today is performed with the assistance of computer-aided equipment. Specifically, computer numerical control (CNC) machines are utilized by a large number of companies that perform any of a wide range of machining applications. CNC machines allow automated machining to be performed while maintaining high precision dimensional tolerancing.

CNC machines use a draw bar to selectively engage one end of a tool holder. The other end of the tool holder contains the desired drilling bit, mill, bore, or other machining tool. Thus, the type of tool holder selected depends upon the type of machining tool that is desired to be used by the CNC machine. The CNC machine also contains a robotic arm, which is known as a tool changer, that performs the automated function of positioning the selected tool holder in an engageable position adjacent the draw bar.

Focusing more specifically on the mounting of a tool holder to a draw bar, the CNC machine engaging end of all tool holders contain a threaded aperture. A small engagement facilitating device, known as a pull stud, includes a threaded shank that rotatably secures into the threaded aperture of a tool holder. In addition to the threaded shank section, pull studs are configured to further include an enlarged diameter section, relatively thin flange section, and an elongated neck section that extends upward from the flange to a knob section at the distal end of the pull stud. Parallel wrenching flats are milled or otherwise formed at diametrically opposite sides of the flange section.

The draw bar of the CNC machine includes an engagement tip which securably grips the knob, elongated neck, and flange sections of a pull stud in order to mount to a tool holder. Since there are many different companies that produce CNC machines, and each company utilizes their own proprietary design, there are several different types of engagement tip configurations. Some engagement tip designs utilize a ball-type mechanism, while others use a clamp and pinch-type mechanism. In addition to the different styles of engagement tip mechanisms, the specific dimensional parameters of the engagement tip mechanisms also vary between CNC machine manufacturers. As a result, several different types of pull studs exist of slightly varying dimensional parameters in order to accommodate the varying engagement tip styles and dimensional configurations.

Due to the high amount of torque that is transmitted through a pull stud from the spindle of a CNC machine, to the tool holder and attached tool, the threaded shank section of a pull stud must be rotatably secured in the threaded aperture of the tool holder at a high degree of torque (on the order of 85 ft. lbs.). This torque is applied to the pull stud at the relatively thin wrenching flats of the flange section of a pull stud. Substantially, the entire remainder of the pull stud outer surface is circular in configuration. Thus, the relatively thin wrenching flats provide the only obvious gripping surface for use in creating a rotational force to remove and install a pull stud from a tool holder.

As such, an open ended wrench (or crescent wrench) is the tool typically utilized for removal of a pull stud. This technique of using an open ended wrench to remove a pull stud has proved most unsatisfactory, since the relatively thin wrenching flats do not provide enough surface area for an open ended wrench to grip the pull stud and produce an adequate amount of torque. The high amount of force that must be used by an operator in attempting to remove the pull stud from the tool holder commonly results in the wrenching flats of the pull stud being rounded or stripped, the wrench being broken, or other disastrous results. This also creates a dangerous situation in which the operator can be injured by the wrench breaking or slipping off of the pull stud while the wrench is attempted to be turned with a large amount of force.

There have been a few minor attempts to produce a mechanism that keeps a crescent wrench-type head from slipping off of the wrenching flats of a pull stud, but these attempts have met with extremely limited success, and as such, have been ignored by the industry as a whole. There is a continuing need in the art for a device that can somehow more securely attach to the exposed portion of a mounted pull stud and dramatically increase the amount of torque that can be generated to facilitate removal of the pull stud from a tool holder.

SUMMARY OF THE INVENTION

The present invention is directed towards a device for facilitating removal a pull stud from a tool holder. A pull stud has a knob, elongated neck, flange, and threaded shank section, and secures in a tool holder via the threaded shank section. The pull stud removal device includes a body comprising a top end, a bottom end, and an outer circumferential surface. The top end of the body contains a drive socket cavity that is sized and configured for receival of a drive socket. The bottom end and an outer circumferential surface of the body contain an aperture that is sized and configured for receival of a pull stud. The aperture is circumscribed by a plurality of inner walls that are correspondingly sized and configured to mate with a pull stud. The receival of a pull stud into the device results in the mating of the inner walls of the aperture with the knob, elongated neck, and flange section of the pull stud, thereby substantially increasing the level of torque that can be applied to a pull stud through a drive socket mounted in the drive socket cavity of the device, for tightening and removing the threaded shank section of the pull stud from a tool holder.

In a preferred embodiment of the present invention, the outer circumferential surface of the body of the pull stud removal device is substantially polygonal and comprises at least three sides that have a tool receiving pattern. The aperture penetrates the bottom end and at least one side of the polygonal body. Further, the aperture is sized and configured for lateral receival of a pull stud. Preferably, the inner walls of the aperture correspond in shape to the outer surfaces of a pull stud to provide for selective simultaneous engagement with the knob, elongated neck, and flange sections of a pull stud.

In one exemplary embodiment, the removal device includes a longitudinal axis. The aperture is generally U-shaped in configuration, and extends inward into the majority of the width (the parameter orthogonal to the longitudinal axis) of the device, beyond the longitudinal axis to laterally receive and position a pull stud in substantially the center of the device.

A pull stud to which the device can be attached preferably includes: (1) a threaded shank section; (2) a flange section further including a circular region lower surface, a circular region outer surface, a circular region upper surface, parallel wrenching flats, and a truncated upper surface; (3) an elongated neck further including a fillet region having a fillet radius, and a cylindrical region; and (4) a knob further including a lower chamfered surface, a central circular surface, an upper circular tapered surface, and an upper end. Correspondingly, the bottom end of the body of the device acts as a mating surface that contacts the circular region upper surface of a pull stud, while the aperture inner walls form mating surfaces that contact the parallel wrenching flats, the truncated region upper surface, the fillet region, the cylindrical region, the lower chamfered surface, and the central circular region of a pull stud.

In one preferred embodiment of the present invention, the polygonal body is formed as a single member and has six sides. The top end of the polygonal body of the device contains a drive socket cavity that is sized and adapted to correspondingly mate with a drive socket. Preferably, at least one of the inner surfaces of the drive socket cavity includes a small depression for selective engagement with a drive socket securement detent. Further, the device is constructed of a metallic material, preferably a high-strength steel.

In another aspect of a preferred embodiment of the present invention, the device additionally includes a retaining device for securing a pull stud within the aperture of the device. In one exemplary embodiment, the retaining device is self-locking, and is rotatably actuated by the insertion of a pull stud into the aperture of the device.

In a pull stud removal device constructed in accordance with the present invention, the inner walls of the aperture correspond in shape to the outer surfaces of the pull stud to provide for selective simultaneous engagement of a substantially large surface area between the removal device and the pull stud, thereby dramatically increasing the level of torque that can be applied to a pull stud through a drive socket mounted in the drive socket cavity of the device, for tightening and removing the threaded shank section of the pull stud from a tool holder. This device provides the above stated benefits that were never before achievable using prior art tools such as wrenches.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
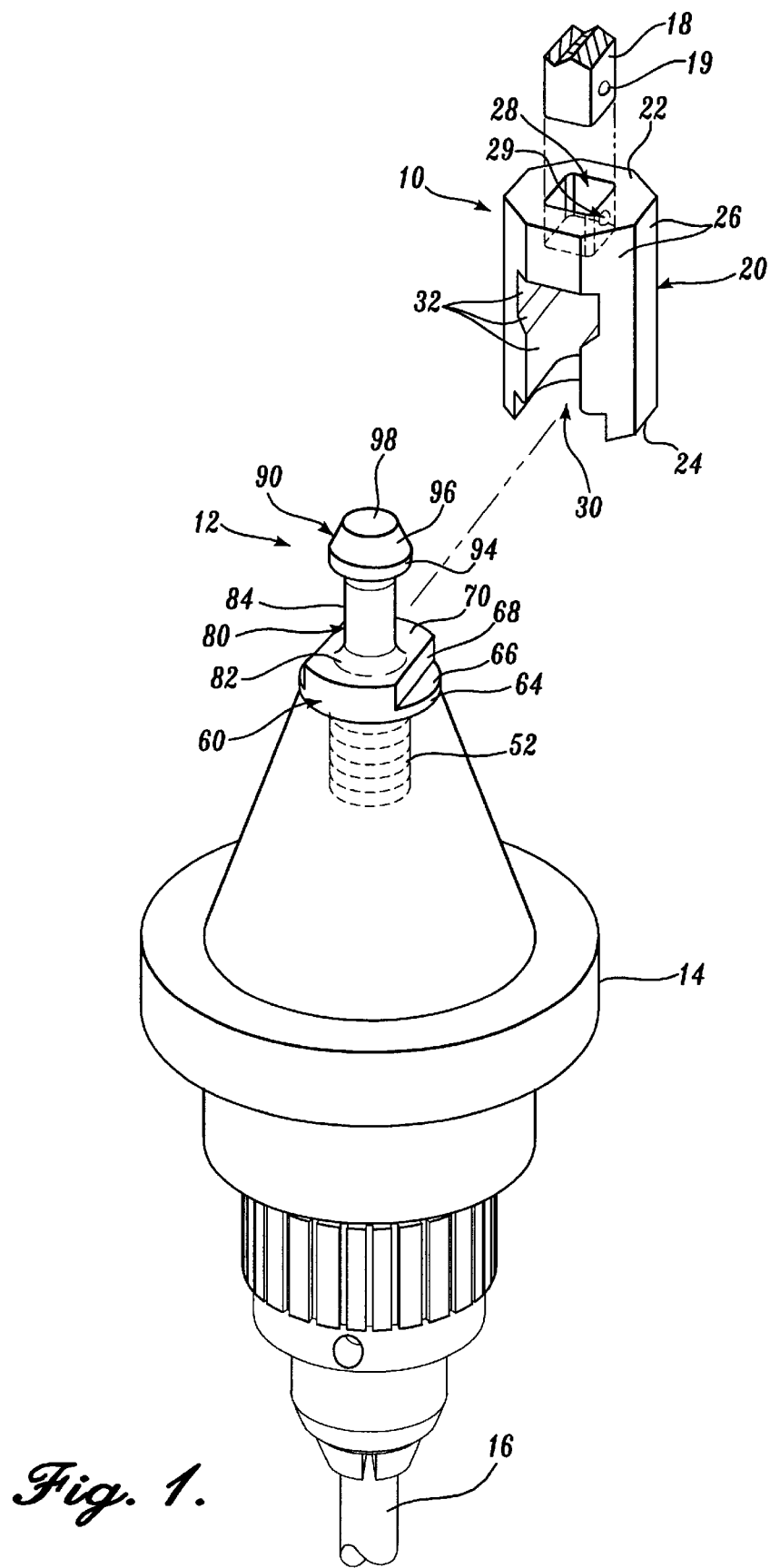
FIG. 1 illustrates an elevated perspective view of a pull stud removal device of the present invention, selectively mounting onto a pull stud that is in turn rotatably secured in a tool holder.
Figure 2:
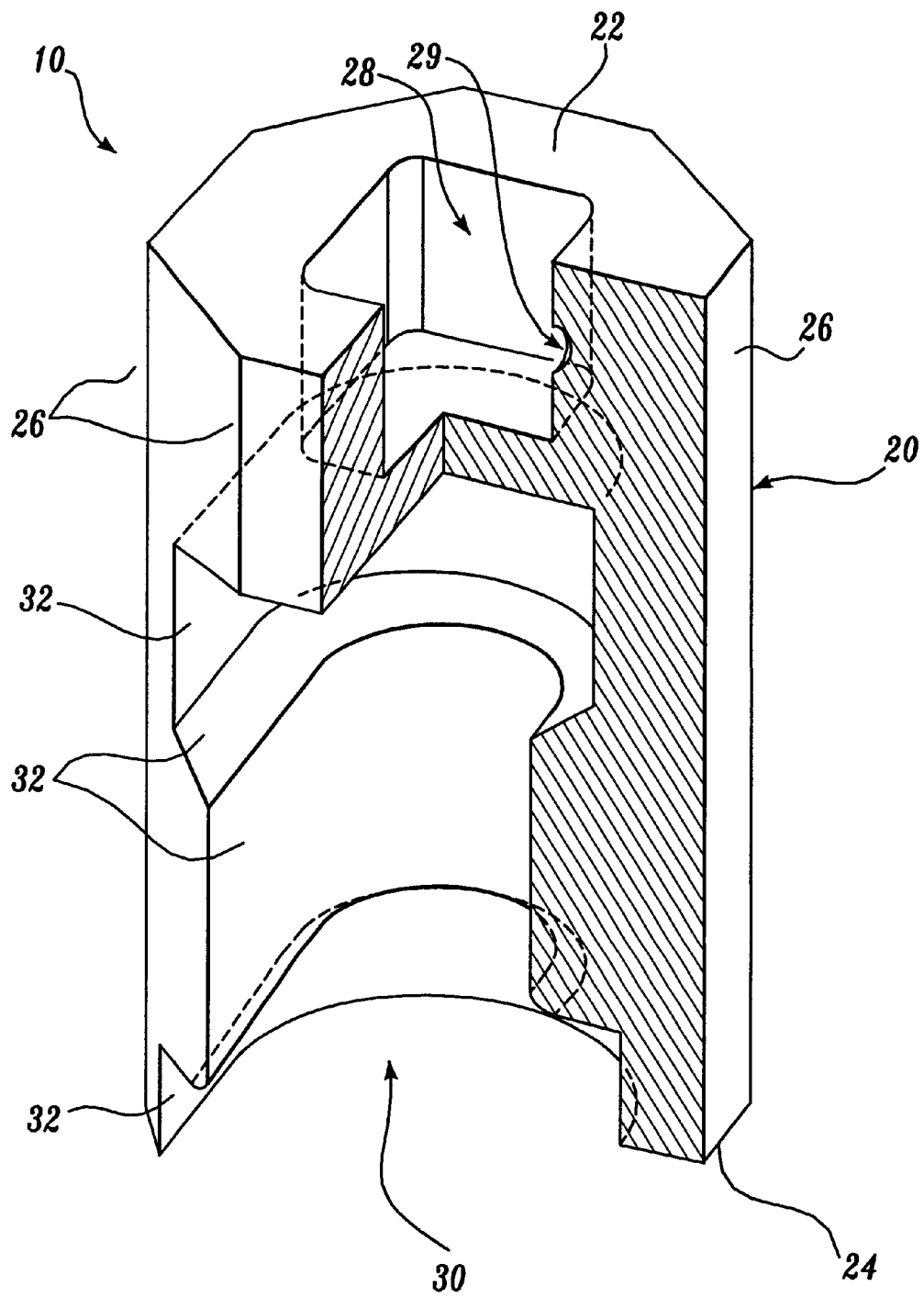
FIG. 2 illustrates a one-quarter cross-section perspective view of the pull stud removal device of FIG. 1.

FIGS. 1 and 2 illustrate a preferred embodiment of a pull stud removal socket 10 constructed in accordance with the present invention and selectively attached to a specific model of a pull stud 12, which is in turn threadably mounted in a tool holder 14. Preferably, the pull stud removal socket 10 has a polygonal-shaped body 20 that includes a top end 22, a bottom end 24, and six outer sidewalls 26 that are configured to form a tool receiving pattern. The top end 22 of the body 20 of the removal socket 10 contains a drive socket cavity 28 that is sized and adapted to correspondingly mate with a drive socket 18. The hexagonal-shaped body 20 contains an aperture 30 that preferably penetrates the bottom end 24 and two of the six outer sidewalls 26. The aperture 30 of the removal socket 10 is sized and configured to laterally slidably receive a specific model design of a pull stud 12. The aperture 30 is circumscribed by a plurality of inner wall surfaces 32 that are correspondingly sized and configured to closely mate with the particular model of pull stud 12. The receival of a pull stud 12 into the aperture 30 of the removal socket 10 results in a portion of the majority of the inner wall surfaces 32 of the aperture 30 mating with a substantially large region of the outer surface area of a pull stud 12, and thereby significantly increases the level of torque that can be applied to a pull stud 12, through a drive socket 18 mounted in the drive socket cavity 28 of the removal socket 10, for tightening and removing a pull stud 12 from a tool holder 14.

Referring again to FIGS. 1 and 2, the pull stud removal socket 10 of the present invention is described for exemplary purposes as mounting on "top" of a pull stud 12 to which the socket attaches. For the purposes of further description and understanding of spatial relations herein, terms such as "top," "bottom," "upper," and "lower" will relate to a removal socket 10, a pull stud 12 and a tool holder 14, that are oriented as shown in FIG. 1. It should be understood that the orientations related above are given by way of example simply to aid description of the invention and to provide a correlation between the present invention and a pull stud 12 to which the removal socket 10 may be mounted. The present invention could be mounted on a pull stud 12 that is secured in a tool holder 14 and oriented in a position other than the orientation exemplified herein (e.g., lying horizontal, vertically inverted, etc.), without departing from the scope of the present invention.

Figure 3:
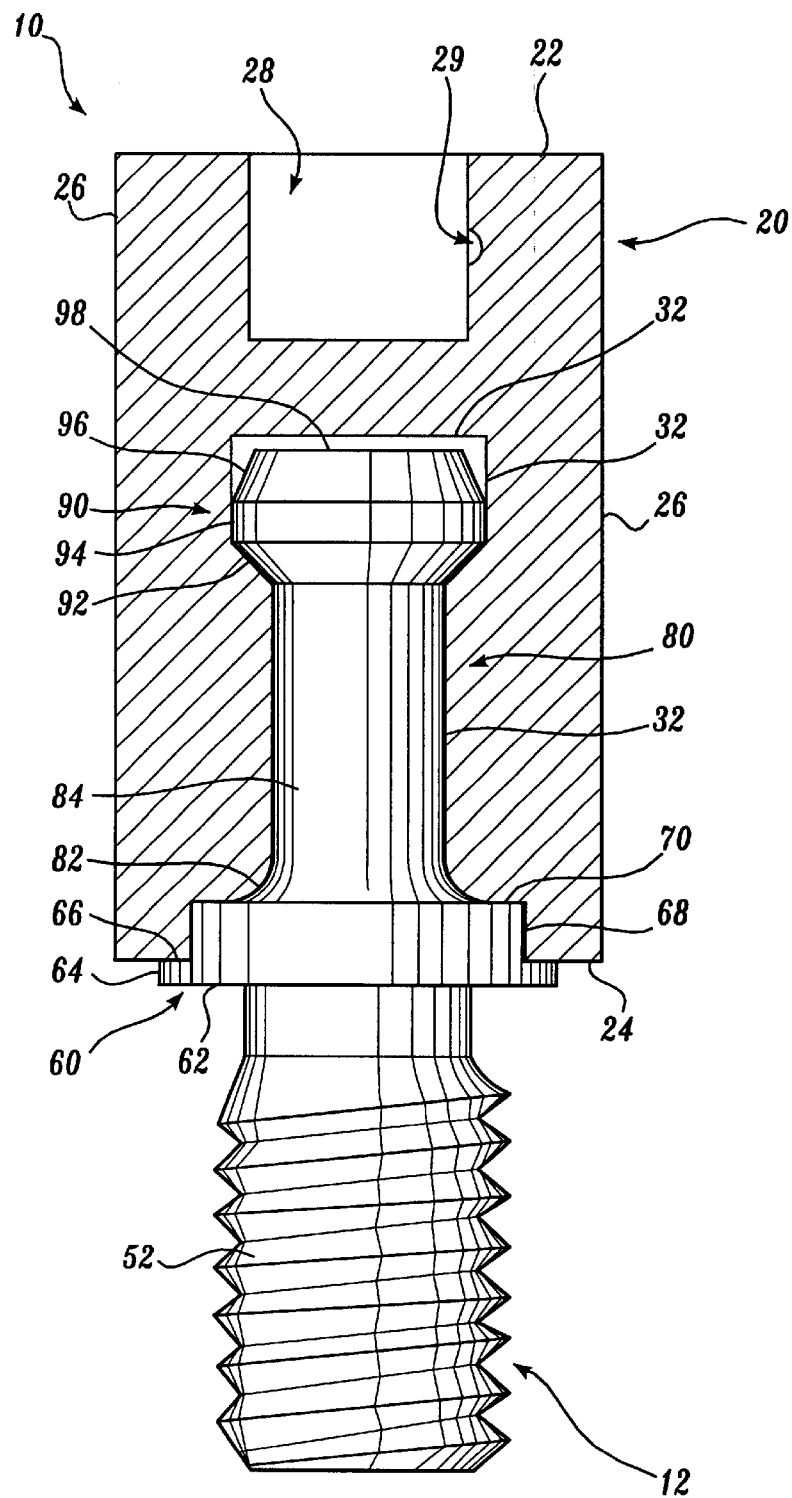
FIG. 3 illustrates a cross-section side view of the pull stud removal device of FIG. 1, mounted on a pull stud.

Pull studs 12, which the removal socket 10 of the present invention is designed to extract from tool holders 14, will now be described in greater detail in order to facilitate understanding of the use of the pull stud removal socket 10 of the present invention. A pull stud 12 includes several different sections, as most clearly shown in FIG. 3. The lower region of the pull stud 12 (oriented as shown in FIG. 3) is configured as a threaded shank section 52. As shown in FIG. 1, the threaded shank section 52 is the area of the pull stud 12 that rotatably secures into a threaded aperture of the tool holder 14. The other end of the tool holder 14 (that is opposite of the pull stud attachment location) contains a selected machining bit 16. Referring again to FIG. 3, the remaining upper region of the pull stud 12 includes an enlarged diameter flange section 60, an elongated neck section 80, and a knob section 90. The enlarged diameter of the flange section 60 comprises several surfaces including a circular region lower surface 62, a circular region outer surface 64, a circular region upper surface 66, parallel wrenching flats 68, and a truncated region upper surface 70. The parallel wrenching flats 68 are configured as including flat, parallel planar surfaces, that are machined into or otherwise formed in the circular region outer surface 64. Typically, the parallel wrenching flats 68 are the only non-circular portions of a pull stud 12.

As previously described, a pull stud 12 also includes an elongated neck section 80. The truncated region upper surface 70 of the flange section 60 transitions into the elongated neck section 80 through a fillet region 82. The fillet region 82 comprises a fillet radius that merges into the cylindrical region 84 of the elongated neck section 80. The cylindrical region 84 represents the majority of the elongated neck section 80 and intersects with the lower chamfered surface 92 of the knob section 90. In addition to the lower chamfered surface 92, the knob section 90 further includes a center circular region 94, an upper circular tapered surface 96, and an upper end 98. In the pull stud 12 shown in FIG. 3, the lower chamfered surface 92 has a chamfer of 45 degrees off of the vertical line designated by the right side of the center cylindrical region 84 of the elongated neck section 80.

As briefly described earlier, there are several different styles and configurations of pull studs 12. The three main styles are commonly referred to by designation as CAT, BT, and V-flange. Further, within each of these different styles of pull stud, there are additional differences in the dimensional parameters of the pull studs. One of the varying dimensional parameters among the pull stud configurations is the angle of chamfer of the lower chamfered surface 92. Common chamfer angles for the lower chamfered surface 92 include, but are not limited to, 50 degrees, 45 degrees, 40 degrees, 35 degrees, 30 degrees, 15 degrees, and zero degrees. Pull stud configurations also differ in the parameters of length and width. This wide number of variations in pull stud design is due to the fact that different CNC manufacturers have differing configurations of the engagement tip of the CNC machine's draw bar. Since the engagement tip must securably engage a pull stud 12 in order to transmit torque from the spindle of the CNC machine to the tool holder 14 and attached machining bit 16, varying pull stud configurations have been designed and produced in order to properly mate with the varying CNC machine designs.

The pull stud removal socket 10 will now be discussed in greater detail. The removal socket 10 is preferably constructed of a metallic material. In one embodiment of the present invention, the removal socket 10 is constructed of 4340 high-strength steel. Further, in one preferred embodiment, the pull stud removal socket 10 is sintered to a hardness level of approximately 58 Rockwell. However, in alternate embodiments of the present invention, other high strength materials or processes may be used, without departing from the scope of the present invention. The specific design of the removal socket inner and outer surfaces are shaped using any known method of milling, cutting, drilling, boring, and shaping techniques.

As shown in FIG. 1, the top end 22 of the body 20 of the removal socket 10 contains a drive socket cavity 28 that is sized and adapted to have inner surfaces that correspondingly mate with the outer surfaces of a drive socket 18. Thus, a drive socket 18 can be easily and effectively secured to the removal socket 10 via the drive socket cavity 28. The drive socket 18 can then be utilized to provide dramatically enhanced torque to remove a pull stud 12 from a tool holder 14, through the connecting removal socket 10. In a preferred embodiment, the drive socket cavity 28 is substantially square and configured to mate with a ½ inch drive socket 18; however, the cavity 28 can also be configured to mate with a drive socket 18 of a different size and/or shape without departing from the scope of the present invention. Preferably, at least one of the inner surfaces of the drive socket cavity 28 includes a small depression 29 for selective engagement with a drive socket securement detent 19. The drive socket cavity 28 allows a drive socket 18 to secure to the removal socket 10 and significantly increases in the level of torque that can be applied to a pull stud 12 for tightening and removing a pull stud 12 from a tool holder 14.

In one preferred embodiment, the body 20 of the pull stud removal socket 10 is polygonal, and appears as a hexagon when viewed from the top or the bottom (the socket is shown as an octagon in FIG. 1). In this embodiment, the hexagonal-shaped body 20 has three pairs of parallel outer sidewalls 26 that comprise the six outer sidewalls 26. This outer sidewall configuration is adapted to be capable of receiving a socket-type tool, which can engage over the exterior of the hexagonal-shaped body 20 of the removal socket 10. However, it should be noted that a removal socket 10 could have a body 20 with a different number of outer sidewalls 26 (instead of six as in the above-described embodiment), without departing from the scope of the present invention. For example, the body 20 could be triangular, square, pentagonal, octagonal, etc., to fit a tool of a different configuration.

Further, since preferably the removal socket 10 is used to rotatably remove a pull stud 12 from a tool holder 14 by applying torque to a drive socket 18 mounted in the drive socket cavity 28, the outer sidewalls 26 which comprise the outer circumferential surface of the body 20 are typically non-functional, and thus may be configured in a circular or other non-linear shape without departing from the scope of the present invention. Linear outer sidewalls 26 are preferable however, in order to provide a back-up removal technique if, for example, a drive socket 18 was unavailable. This back-up removal technique would still allow an increased level of torque to be applied, resulting from the removal socket 10 having relatively large wrenching surfaces (the linear outer sidewalls 26) that are spaced further apart from each other than are the relatively small and thin wrenching flats 68 (which are spaced closer together and thus have a smaller moment arm) of a pull stud 12 itself. Alternatively, the plurality of outer surfaces that define a tool receiving pattern may also include outer sidewalls on a drive socket protrusion that could extend from the top end 22 of the removal socket 10, and be utilized as wrenching surfaces, instead of the drive socket cavity 28.

Specifically, the aperture 30 of the pull stud removal socket 10, as most clearly shown in FIGS. 2 and 3, will now be discussed. The aperture 30 is generally U-shaped in configuration and extends inward, transversely into the body 20 of the socket 10, the majority of the width (the parameter orthogonal to the longitudinal axis of the socket 10) of the socket. The aperture 30 is sized and configured to laterally receive and position the pull stud 12 in substantially the center of the removal socket 10, such that the longitudinal axis of the removal socket 10 is substantially aligned with the longitudinal axis of the pull stud 12. This alignment of the pull stud longitudinal axis with the removal socket longitudinal axis facilitates efficient rotational removal of the pull stud 12 through the rotation of the removal socket 10.

In one preferred embodiment of the present invention, the aperture 30 intersects two of the six outer sidewalls 26. However, the number of sidewalls 26 intersected by the aperture 30 will vary depending upon the placement of the aperture 30 and/or the total number of outer sidewalls 26 in the particular removal socket embodiment. The number of sidewalls 26 penetrated by the aperture 30 can change without departing from the scope of the present invention.

Examination of the aperture 30 reveals that the aperture contains numerous specifically configured inner wall surfaces 32 that are designed to correspond to the outer surface of a specific pull stud 12 configuration. As shown in FIG. 3, preferably the bottom end 24 of the body 20 of the removal socket 10 acts as a mating surface that contacts the circular region upper surface 66 of the pull stud 12 to which the removal socket 10 can be attached. Further, preferably the inner wall surfaces 32 of the aperture 30 correspondingly contact the parallel wrenching flats 68, the truncated region upper surface 70, the fillet region 82, the cylindrical region 84, the lower chamfered surface 92, and the center circular region 94. In the embodiment of the present invention shown in FIG. 3, the pull stud removal socket 10 does not contact the upper circular tapered surface 96 or the upper end 98 of the knob section 90; however, in other embodiments the removal socket 10 may be further configured to also contact either or both of these two surfaces without departing from the scope of the present invention.

Figure 4:
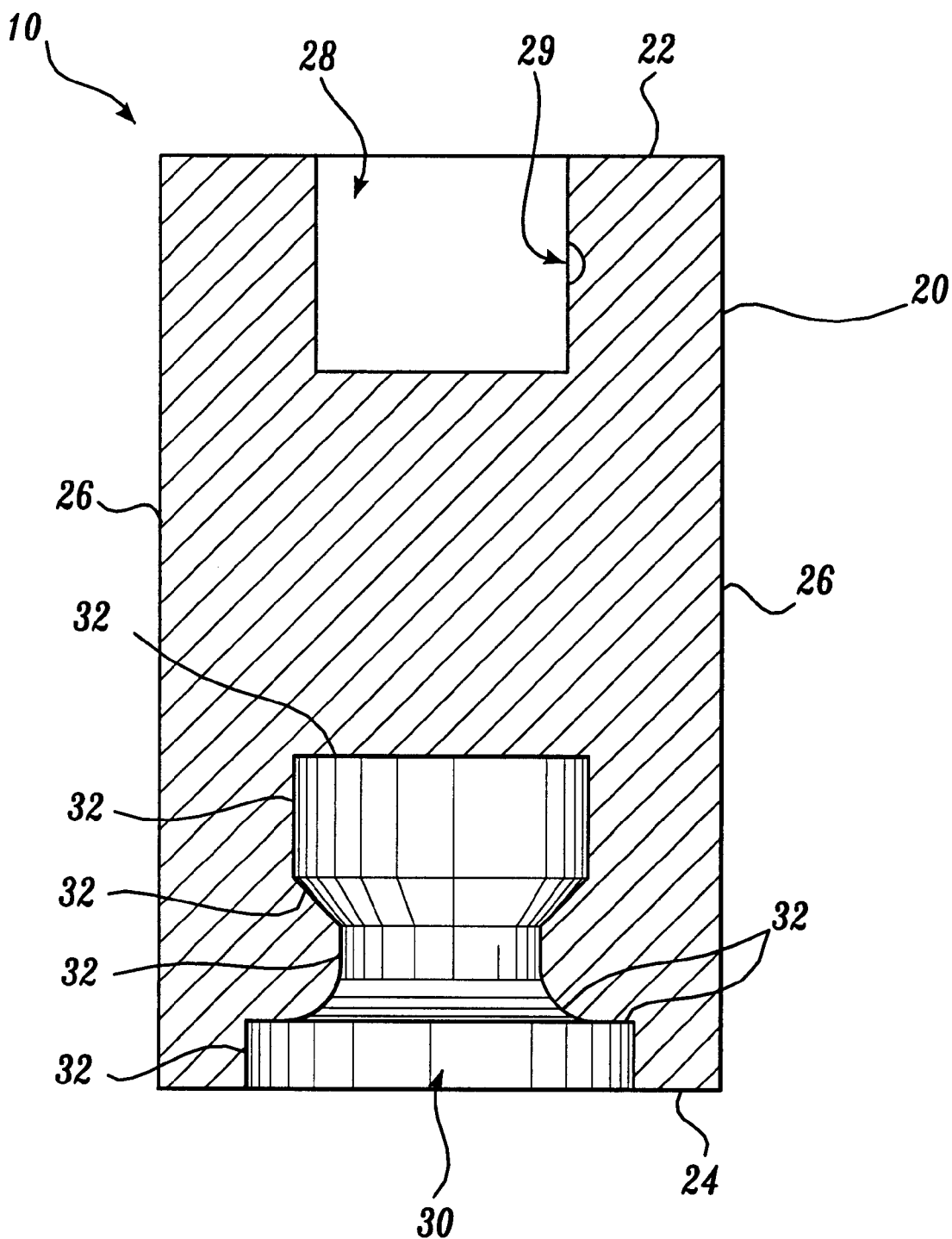
FIG. 4 illustrates a cross-section side view of an alternative pull stud removal device sized and configured to correspondingly mate with a pull stud of a different configuration.

Since, as previously mentioned, there are several different styles of pull studs and several different varying dimensional parameters within these styles, the removal socket 10 of the present invention must be specifically configured to fit a particular pull stud model design. FIG. 4 illustrates a pull stud removal socket 10, constructed in accordance with the present invention, that is sized and configured to correspond to the shape of a different style pull stud having modified dimensional parameters. Clearly, the removal socket of FIG. 3 and the removal socket of FIG. 4 would not be interchangeable, but rather could only be utilized to remove their specific corresponding pull stud configuration.

As previously mentioned, the only portions of a pull stud 12 that contain flat, parallel sides are the parallel wrenching flats 68 of the flange section 60. The entire remaining surface area of the pull stud 12 is circular. These circular regions of the pull stud 12 are defined herein to include the circular region lower surface 62, the circular region outer surface 64, circular region upper surface 66, the truncated region upper surface 70, the fillet region 82, the cylindrical region 84, the knob lower chamfered surface 92, the knob center circular region 94, the knob upper circular tapered surface 96, and the knob upper end 98. Thus, the parallel wrenching flats 68 have always been the focus of previously conceived removal devices, with respect to the region to which torque should be applied.

However, the present invention utilizes correspondingly fitted surface contact with a plurality of circular regions of the pull stud 12, in addition to corresponding securement with the parallel wrenching flats 68. In this manner, the tightly toleranced corresponding fit of the inner wall surfaces 32 to circular regions of the pull stud 12 (specifically the fillet region 82 and the lower chamfered surface 92 in the present embodiment) acts to seat the removal socket 10 onto pull stud 12 (thus removing any possible "slop" or otherwise unsatisfactory closely mated fitting) and effectively "lock" the inner wall surfaces 32 of the removal socket 10 onto the parallel wrenching flats 68, thereby increasing the amount of torque that can be efficiently applied to a pull stud 12 in order to remove (or install) the threaded shank section 52 of a pull stud 12 from a tool holder 14. The inner wall surfaces 32 of the aperture 30 produce a secure engagement that is unlikely to dislodge during pull stud removal, in contrast to problems experienced when wrench-type devices have been utilized. Any device that is attempted to be used for pull stud removal, that is not configured for a specific pull stud style and configuration, will be incapable of creating a tightly toleranced corresponding fit with the pull stud, due to variations in the pull stud length, width, and chamfer, and thus, will be incapable of allowing the level of torque produced by the present invention to be generated.

Figure 6:
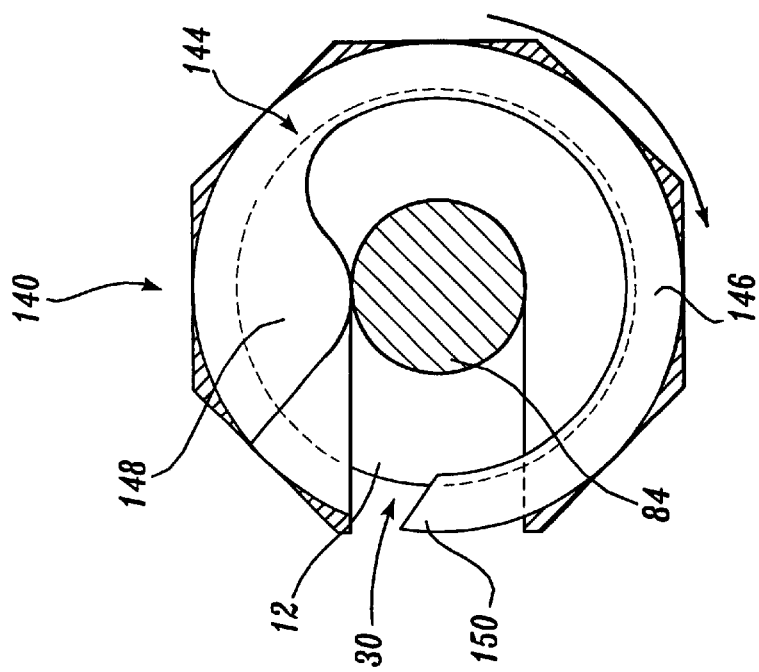
FIG. 6 illustrates a top view of the alternative pull stud removal device of FIG. 5, with the retaining mechanism rotated, thereby securing the pull stud within the removal device.
Figure 5:
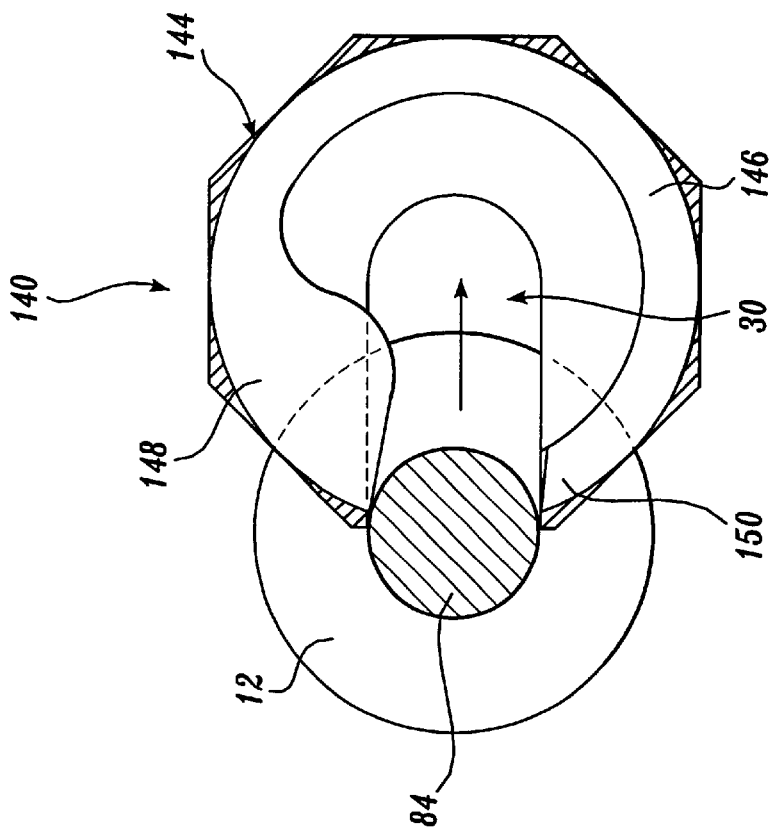
FIG. 5 illustrates a top view of an alternative pull stud removal device that includes a rotatably self-locking retaining mechanism, and a pull stud being inserted into the removal device.

An alternate pull stud removal socket 140, constructed in accordance with the present invention, is shown from a top view in FIGS. 5 and 6. This alternate pull stud removal socket 140 is similar to the removal device 10, except for the addition of a rotatable retaining device 144 that is contained in the body 20 of the socket 140, preferably in the elongated neck section 80. The rotatable retaining device 144 acts as a self-locking mechanism for further securing the engagement of a pull stud 12 in a removal socket 140 during utilization of the socket. As shown in FIGS. 5 and 6, the retaining device 144 is configured in the shape of a truncated ring 146 having a bulbous portion 148 at one end of the ring.

The missing section in the truncated ring 146 provides a wide enough gap for the cylindrical region 84 of the elongated neck section 80 to pass through and allow a pull stud 12 to seat fully within the aperture 30. However, as the elongated neck section 80 passes through the gap in the ring 146 of the retaining device 144, it intersects with the bulbous region 148 and pushes the bulbous region 148 out of its path. When the elongated neck section 80 of the pull stud 12 pushes the bulbous region 148 of the retaining device 144, the retaining device is forced to rotate. As a result of the rotation, the non-bulbous end 150 of the retaining device 144 is rotated at least partially in front of the opening created by the aperture 30. Thus, the pull stud 12 is locked in place by the retaining device 144 within the aperture 30 until it is desired to be manually removed by an operator upon the completion of the pull stud removal process.

The present invention has been described in relation to a preferred embodiment and several preferred alternate embodiments. One of ordinary skill after reading the foregoing specification, may be able to effect various other changes, alterations, and substitutions or equivalents thereof without departing from the concepts disclosed. It is therefore intended that the scope of the letters patent granted hereon will be limited only by the definitions contained in the appended claims and equivalents thereof.

The embodiments of the invention in which an exclusive property or privilege is claimed are defined as follows:

1. A device for facilitating removal of a pull stud from a tool holder with a drive tool, a pull stud having a knob, an elongated neck, a flange section, and a threaded section, the device comprising:

a body comprising:

a top end, a bottom end, and an outer circumferential surface;

a drive tool cavity size and configured for receival of a drive tool to which the device attaches, the cavity adapted to correspondingly mate with a drive tool;

a pull stud aperture containing a plurality of inner walls, wherein the aperture is a lateral slot opening sized and configured to laterally receive and position a pull stud in substantially the center of the device; and a retaining device for securing a pull stud within the aperture of the device;

whereby the receival of a pull stud into the device, and mating of the inner walls of the aperture with a pull stud substantially increases the torque that can be applied to a pull stud through a drive tool mounted in the drive tool cavity of the device for tightening and removing the threaded section of a pull stud from a tool holder.

2. The device of claim 1, further comprising a longitudinal axis and having a width dimension that is defined as orthogonal to the longitudinal axis, wherein the aperture is generally U-shaped in configuration, and extends inward into the device over half of the width of the device beyond the longitudinal axis.

3. The device of claim 1, wherein the drive tool cavity is located in the top end of the device.

4. The device of claim 1, wherein the outer circumferential surface comprises a plurality of sidewalls cooperatively defining a tool receiving pattern.

5. The device of claim 4, wherein the plurality of sidewalls cooperatively defining a tool receiving pattern comprises six sidewalls.

6. The device of claim 1, wherein the device is comprised of a single member.

7. The device of claim 1, wherein the retaining device is self-locking and is actuated when the arcuate surfaces of a pull stud contact the inner walls of the aperture.

8. The device of claim 1, wherein the device is constructed of a metallic material.

9. A device for facilitating removal of a pull stud from a tool; holder with a drive tool, a pull stud having a knob, an elongated neck, a flange section, and a threaded section, the device comprising:

a body containing a top end, a bottom end, and an outer circumferential surface; and wherein the body includes a drive tool cavity penetrating the top end, the cavity sized and configured for receival of a drive tool to which the device attaches, the cavity adapted to correspondingly mate with a drive tool; and wherein the body includes an aperture penetrating the bottom end and the outer circumferential surface, the aperture being a lateral opening slot is sized and configured for lateral receival of a pull stud to which the device attaches, the aperture containing a plurality of inner walls correspondingly sized and configured to mate with a pull stud and simultaneously contact the knob, elongated neck, and flange section of a pull stud to which the device attaches;

whereby the lateral receival of a pull stud into the device, and contact with the inner walls of the aperture substantially increases the torque that can be applied to a pull stud through a drive tool mounted in the drive tool cavity of the device for tightening and removing the threaded section of a pull stud from a tool, wherein the device further comprises a retaining device for securing a pull stud within the aperture of the device.

10. The device of claim 9, further comprising a longitudinal axis and having a width dimension that is defined as orthogonal to the longitudinal axis, wherein the aperture is generally U-shaped in configuration, and extends inward into the device over half of the width of the device beyond the longitudinal axis.

11. The device of claim 9, wherein the aperture is sized and configured to laterally receive and position a pull stud in substantially the center of the device.

12. The device of claim 9, wherein the outer circumferential surface comprises a plurality of sidewalls cooperatively defining a tool receiving pattern.

13. The device of claim 12, wherein the plurality of sidewalls cooperatively defining a tool receiving pattern comprises six sidewalls.

14. The device of claim 13, wherein the portion of the outer circumferential surface penetrated by the aperture comprises two sidewalls.

15. The device of claim 9, wherein the device is comprised of a single member.

16. The device of claim 9, wherein the retaining device is self-locking and is actuated when the arcuate surfaces of a pull stud contact the inner walls of the aperture.

17. The device of claim 9, wherein the device is constructed of a metallic material.

18. A device for removing a pull stud from a tool, having a knob, an elongated neck, a flange section, and a threaded section, the knob, elongated neck, and flange section defining a male portion of a pull stud, the device comprising:

a body containing a top end, a bottom end, and a plurality of outer surfaces defining a tool receiving pattern; the body further defining a lateral opening cavity sized and configured to create a female portion for lateral receival of a corresponding male portion of a pull stud to which the device attaches, the cavity containing a plurality of inner surfaces correspondingly sized and configured to mate with a male portion of a pull stud and a retaining device for securing a pull stud within the aperture of the device;

whereby the receival of a pull stud into the device, and mating of the female portion of the device with a male portion of a pull stud substantially increases the level of torque that may be applied to a pull stud for threadably tightening and loosening a pull stud from a tool.

19. A device for facilitating removal of a pull stud from a tool holder, the device comprising:

a top end, a bottom end, and an outer circumferential surface;

a drive tool cavity sized and configured for receival of a drive tool to which the device attaches, the cavity adapted to correspondingly mate with a drive tool; and a pull stud aperture, the pull stud aperture containing a plurality of inner walls configured to mate with a pull stud, wherein at least a portion of the inner walls are tapered and wherein the device further comprises a retaining device for securing a pull stud within the aperture of the device.

20. The device of claim 19, wherein the taper in at least a portion of the inner walls is shaped such that when a pull stud is inserted into the aperture, the tolerance between the aperture and a pull stud is reduced.

* * * * *

UNITED STATES PATENT AND TRADEMARK OFFICE
CERTIFICATE OF CORRECTION

PATENT NO. : 6,360,634 B1  
DATED : March 26, 2002  
INVENTOR(S) : D.W. Leitch

It is certified that error appears in the above-identified patent and that said Letters Patent is hereby corrected as shown below:

Column 8,
Line 58, "size" should read -- sized --

Column 9,
Line 29, "tool; holder" should read -- tool holder --

Signed and Sealed this

Fourth Day of June, 2002

*Attest:*

*Attesting Officer*

JAMES E. ROGAN  
*Director of the United States Patent and Trademark Office*